US009044749B2

(12) United States Patent
Wilmer

(10) Patent No.: US 9,044,749 B2
(45) Date of Patent: Jun. 2, 2015

(54) PIPETTE

(71) Applicant: Eppendorf AG, Hamburg (DE)

(72) Inventor: Jens Wilmer, Ahrensburg (DE)

(73) Assignee: Eppendorf AG, Hamburg (DE)

( * ) Notice: Subject to any disclaimer, the term of this patent is extended or adjusted under 35 U.S.C. 154(b) by 310 days.

(21) Appl. No.: 13/777,225

(22) Filed: Feb. 26, 2013

(65) Prior Publication Data

US 2013/0233095 A1 Sep. 12, 2013

Related U.S. Application Data

(60) Provisional application No. 61/604,834, filed on Feb. 29, 2012.

(51) Int. Cl.
*B01L 3/02* (2006.01)
*G01F 22/00* (2006.01)

(52) U.S. Cl.
CPC ............... *B01L 3/021* (2013.01); *B01L 3/0224* (2013.01); *B01L 2200/148* (2013.01)

(58) Field of Classification Search
CPC ............................... B01L 3/021; B01L 3/0224
USPC ........................................................ 422/100
See application file for complete search history.

(56) References Cited

U.S. PATENT DOCUMENTS

| | | | | |
|---|---|---|---|---|
| 3,827,305 | A | 8/1974 | Gilson et al. | |
| 4,020,698 | A | 5/1977 | Marteau D'Autry | |
| 4,096,750 | A * | 6/1978 | Sturm | 73/864.18 |
| 4,096,751 | A * | 6/1978 | Withers et al. | 73/864.18 |
| 4,171,073 | A | 10/1979 | Mann et al. | |
| 5,012,682 | A * | 5/1991 | Sabloewski | 73/864.18 |
| 5,531,131 | A * | 7/1996 | Sabloewski | 73/864.18 |
| 6,428,750 | B1 | 8/2002 | Rainin et al. | |
| 7,175,813 | B2 * | 2/2007 | Petrek et al. | 422/516 |
| 8,133,453 | B2 * | 3/2012 | Molitor | 422/501 |
| 2005/0155438 | A1 | 7/2005 | Belgardt | |
| 2005/0247141 | A1 * | 11/2005 | Belgardt et al. | 73/864.01 |
| 2007/0014696 | A1 | 1/2007 | Molitor | |
| 2010/0083775 | A1 * | 4/2010 | Wilmer | 73/864.18 |
| 2013/0199312 | A1 * | 8/2013 | Wilmer et al. | 73/864.14 |
| 2013/0291660 | A1 * | 11/2013 | Wilmer et al. | 73/864.13 |
| 2014/0147349 | A1 * | 5/2014 | Schmidt, Peter | 422/522 |

FOREIGN PATENT DOCUMENTS

| | | |
|---|---|---|
| DE | 4335863 | 2/1995 |
| DE | 102004003434 | 8/2005 |
| EP | 1743701 | 1/2007 |
| WO | 84/00119 | 1/1984 |
| WO | 03/033151 | 4/2003 |

* cited by examiner

*Primary Examiner* — Peter Macchiarolo
*Assistant Examiner* — Alexander Mercado
(74) *Attorney, Agent, or Firm* — Vidas, Arrett & Steinkraus

(57) ABSTRACT

A pipette with a rod-shaped casing, a seat, a displacement equipment, comprising a displacement chamber with a relocatable limit, a connection channel, a drive equipment for relocating the relocatable limit of the displacement chamber, coupled to the relocatable limit and having an axially relocatable lifting rod, an upper stop body, a lower stop body and a stop element on the circumference of the lifting rod for limiting the stroke of the lifting rod, an overstroke spring, a stationary screw element, and with a screw element that is relocatable in the casing, a toothing, running along a helical line with the same pitch as that of the thread of the relocatable screw element and having teeth on the upper edge of the relocatable screw element that are directed in the direction of the instantaneous axis of the relocatable screw element, a toothed driving wheel, and means for rotating the toothed driving wheel.

15 Claims, 9 Drawing Sheets

PIPETTE

CROSS-REFERENCE TO RELATED APPLICATIONS

This application claims priority to provisional patent application No. 61/604834, filed Feb. 29, 2012.

STATEMENT REGARDING FEDERALLY SPONSORED RESEARCH

Not applicable

BACKGROUND OF THE INVENTION

The present invention relates to a pipette for replaceable pipette tips.

Pipettes are used in the laboratory in particular for metering liquids. For this purpose, a pipette tip is clamped fast on a seat of the pipette with an upper opening. The seat is mostly a conical or cylindrical projection with respect to a casing of the pipette, onto which a pipette tip can be clamped with the upper opening thereof. The pipette tip can pick up and give out liquid through a lower opening. Air cushion pipettes comprise a displacement equipment for air, which is communicatingly connected to the pipette tip through a hole in the seat. An air cushion is relocated by means of the displacement equipment, so that liquid is sucked into the pipette tip and ejected out from there. For this purpose, the displacement equipment has a displacement chamber with a relocatable limit. The displacement equipment is mostly a cylinder with a piston that can be relocated therein.

After use, the pipette tips are released from the seat and replaced by a fresh pipette tip. Contaminations in subsequent meterings can be avoided through this. Pipette tips have usually an ejection device for ejecting the pipette tips, which permit ejection by actuation of a button without having to touch the pipette tips. Single use pipette tips made of plastics are available at low cost.

The relocatable limit is coupled to a drive equipment, which serves for shifting the piston in the cylinder. The drive equipment has a lifting rod, which can be shifted between an upper and a lower stop with a stop element. In the beginning of the aspiration of air into the displacement chamber, the stop element is situated at the lower stop. In the beginning of the displacement of air out of the cylinder, the stop element rests on the upper stop. The amount of liquid that is picked up or delivered, respectively, depends on the stroke of the relocatable limit, and thus on the stroke of the lifting rod. The stroke volume of the relocatable limit does not correspond exactly to the amount of liquid that is picked up or delivered. As the air column expands somewhat under the weight of the liquid, the stroke volume exceeds the volume of the liquid. The deviation between the stroke volume and the liquid's volume depends in particular on the density and viscosity of the liquid, the temperature, the air pressure and on wetting effects. For instance from the document WO 03/0331515 or U.S. Pat. No. 3,827,305, the entire contents of which is incorporated herein by reference, it is known to calibrate pipettes to a certain metering volume by adjusting the position of an upper stop body.

In fixed volume pipettes, the distance between upper and lower stop is constant. A fixed volume pipette with an upper stop body in the form of a threaded sleeve that is adjustable by a calibration tool is known from the document U.S. Pat. No. 4,020,698, the entire contents of which is incorporated herein by reference,.

In pipettes with adjustable metering volume, the position of the upper stop is variable. Known pipettes have an upper stop body in the form of a threaded spindle, which is adjustable in a spindle nut which is fixedly disposed in the casing. In order to adjust the threaded spindle, there are adjustment equipments, which are coupled to indicating equipments in the form of a counter for indicating the set metering volume. The document DE 43 35 863 C1, the entire contents of which is incorporated herein by reference, describes a pipette wherein the indicating equipments can be uncoupled from the adjustment equipment(s) for calibration.

In the known pipettes, a factory calibration is performed by the pipette manufacturer under standard conditions. In this, double distilled water is pipetted at a temperature of 20 to 25° C. and an air pressure of 1013 mbar. In order to pipette under other conditions, the user must change the factory calibration. Changing the factory calibration and later retrieval of the factory calibration is sumptuous.

The document EP 1 743 701 B1, the entire contents of which is incorporated herein by reference, describes a pipette wherein the lower stop body is held in a holder. An overstroke spring is disposed between the lower stop body and the holder. In addition, there is an adjustment equipment for adjusting the position of the holder with respect to the cylinder. An indicating equipment shows the respective position of the holder. This pipette permits simple calibration by the user, for instance when a liquid is to be metered which has another density or viscosity than double distilled water, or when it is to be worked at different air pressure or temperature. The calibration by the user is made by just only adjusting the lower stop body. The adjustment of the upper stop body and of the indicating equipment made in the factory calibration is not changed at all. The indicating equipment indicates the respective position of the lower stop body. The position of the lower stop body occupied in the factory calibration can easily be found again at any time.

In a practical embodiment, the holder is screwed coaxially to the lifting rod into a carrier which is fixedly disposed in the casing. An indicator ring, disposed coaxially to the lifting rod and having a bevel wheel toothing at the upper edge is rotatably mounted in the carrier. Driving pins project upward from the indicator ring and parallel to the lifting rod, which engage in the axial direction into holes in the bottom of the pot-shaped holder. A pinion is rotatably mounted on the carrier, is engaged with the bevel wheel toothing and has a hexagon socket in a front side. A tool can be inserted in the tool application device through a hole in the casing, in order to rotate the pinion. In this action, the indicator ring is rotated which rotates the holder along via the driving pins. As the holder is screwed into a thread of the carrier, the axial position of the holder in the carrier is changed, and thus also the axial position of the lower stop body. The change of the axial position of the holder with respect to the indicator ring is compensated by the variable introduction depths of the driving pins into the driving holes.

In the known device for user calibration, the precision of the calibration is impaired due to manufacture tolerances and wear of the many component parts. Moreover, the manufacturing expense is high due to the many component parts.

Starting from this, the present invention is based on the task to provide a less sumptuous pipette which offers a user calibration to the user with better calibration precision and being independent of the factory calibration.

BRIEF SUMMARY OF THE INVENTION

The task is achieved by a pipette with the features of claim 1. Advantageous embodiments of the pipette are indicated in subclaims.

The pipette of the present invention has a rod-shaped casing, a seat for detachably holding a pipette tip on the lower end of the casing, a displacement equipment, comprising a displacement chamber with a relocatable limit, a connection channel, connecting the displacement chamber with an opening in the seat, a drive equipment for relocating the relocatable limit of the displacement chamber, coupled to the relocatable limit and having an axially relocatable lifting rod, an upper stop body, a lower stop body and a stop element on the circumference of the lifting rod for limiting the stroke of the lifting rod, an overstroke spring, via which the lower stop body is supported against relocation towards the downside on an overstroke spring support, a stationary screw element, fixedly connected to the casing, and a screw element that is relocatable in the casing and is engaged to the screw element and is coupled to the lower stop body in order to relocate it in the axial direction of the lifting rod when the relocatable screw element is being relocated, a toothing, running along a helical line with the same pitch as that of the thread of the relocatable screw element and having teeth on the upper edge of the relocatable screw element that are directed in the direction of the instantaneous axis of the relocatable screw element, a toothed driving wheel, rotatably mounted on a bearing that is fixedly connected to the casing, and being engaged with the toothing of the relocatable screw element, and means for rotating the toothed driving wheel.

In the pipette of the present invention, the lifting rod having the stop element can be relocated between the upper stop body and the lower stop body. The stroke of the lifting rod and the relocatable limit is limited and the metering volume is determined through this. Moreover, the lower stop body is supported via an overstroke spring, so that an overstroke for blowing out residual liquid from a pipette point is possible by overcoming the spring force of the overstroke spring. The lower stop body is adjustable for calibration by the user. For this purpose, the relocatable screw element is relocatable on the stationary screw element, and it adjusts the lower stop body in the axial direction when it is being relocated. The stroke of the lifting rod and of the relocatable limit is changed through this.

In order to drive the relocatable screw element, the latter has a toothing on the upper edge with teeth which are directed parallel to the instantaneous axis of the relocatable screw element. The toothing runs along a helical line which has the same pitch as that of the thread of the relocatable screw element which engages into the thread of the stationary screw element. The toothed driving wheel, rotatably mounted on a bearing that is fixedly connected to the casing, is engaged with the toothing. When the toothed driving wheel is being rotated by means of the means for rotating, the relocatable screw element is screwed in the stationary screw element and axially relocated through this. In that the toothing of the relocatable screw element runs along a helical line having the same pitch as the thread of the relocatable screw element, the toothing remains in engagement with the toothed driving wheel. Due to this construction, component parts are saved compared to the conventional means for calibration by the user. Error sources are reduced through this, and the precision of the calibration is improved. Moreover, the expense for manufacture and the production cost are reduced.

According to one embodiment, the relocatable screw element is a threaded ring, disposed concentrically to the lifting rod and having a thread on the circumference, which has the toothing at the topside and rests on the lower stop body at the downside. The threaded ring can be housed in the casing in a space-saving manner, and it can uniformly rest on the lower stop body with its lower edge.

According to a further embodiment, the stationary screw element is a hollow cylindrical lifting body which has an external thread at the outer circumference to which an internal thread on the inner circumference of the threaded ring is engaged, the lifting body has several axially extending slots, the lower stop body is arranged in the lifting body and the lower stop body has several outwardly projecting projections which grip through the slots and have portions that jut out of the lifting body and on which the threaded ring is seated. A space-saving arrangement of the stationary screw element and the lower stop body is made possible through this.

According to a further embodiment, the overstroke spring support is disposed in the lifting body, and the overstroke spring is disposed in the lifting body between the lower stop body and the overstroke spring support. Overstroke spring support and overstroke spring are accommodated in a space-saving manner through this. In addition, the lifting body serves as a receiver and as a carrier for the overstroke spring support and the overstroke spring in a space-saving manner.

In one configuration of the pipette as a fixed volume pipette, the upper stop body is fixedly arranged in the casing. In a pipette with adjustable metering volume, the upper stop body is disposed in the casing so as to be displaceable in the axial direction of the lifting rod. According to a preferred embodiment, the upper stop body is a threaded spindle which is screwed into a spindle nut that is fixedly connected to the casing, and which has an upper passage channel through which the lifting rod is guided through, and/or the lower stop body is circular disc shaped and has a lower passage channel through which the lifting rod extends.

According to a further embodiment, the lifting body is fixedly connected to the spindle nut at the topside. This permits a space-saving housing of the means for adjusting the metering volume. The lifting body serves as a seat and as a carrier for nut, spindle and lifting rod, which is inserted into the upper passage hole and can be relocated between the upper and the lower stop body with the stop element.

According to a further embodiment, the bearing of the toothed driving wheel is fixedly connected to the lifting body above the external thread. In this embodiment, the lifting body serves also as the carrier of the toothed driving wheel.

In the assembly of the pipette, the lifting body can be separately equipped with the different component parts. The equipped lifting body is a subassembly which can be mounted in the casing as a whole.

According to a further embodiment, the lifting body is connected to the casing via a snap connection. The lifting body can be fixedly connected to the casing in a simple manner through this. As the case may be, the snap connection can be released selectively for dismounting the lifting body.

According to a further embodiment, the stationary screw element and the relocatable screw element are bevel wheels or contrate wheels.

According to a further embodiment, there is an indicating equipment for indicating the position of the lower stop body.

According to a further embodiment, the threaded ring has marks at the outer circumference, spaced apart from each other in the circumferential direction, and the casing has a window for reading a mark that is disposed under the window. The marks serve for indicating the respective adjustment of the displaceable screw element to the user, and thus also that of the lower stop body. In a preferred embodiment, there is a special mark which indicates for the user that the lower stop body has occupied the position in which the factory calibration has been made. On both sides of this central mark, there may be further marks, which indicate the deviation of the position of the lower stop body from the factory calibration in both directions.

According to a further embodiment, the marks on the circumference of the toothed drive wheel are disposed on a helical line, whose pitch corresponds to the pitch of the thread of the relocatable screw element. Through this, it is achieved that the different marks can always be seen at the same position in the window when the relocatable screw element is rotated, in spite of the axial position change of the relocatable screw element accompanied with this.

According to a further embodiment, the toothed drive wheel has a tool application device for rotating the toothed drive wheel, and the casing has a hole through which the tool application device is accessible my means of a tool that is introduced into the hole from the outside. Thus, the user can perform the user calibration purposefully by applying the tool on the tool application device and rotating the tool in different directions. The tool application device is for instance a slit, cross recess, torx, hexagon socket or another polygon socket.

In a further embodiment, there are means for limiting the rotation of the relocatable screw element, which prevent the highest tooth of the toothing from disengaging from the toothed drive wheel. The highest tooth of the axial toothing is that tooth which is disposed at the highest position of the helical line along which the toothing of the relocatable screw element runs. By the limit, the toothing is prevented to disengage from the toothed drive wheel.

By way of example, the limit is a radially projecting projection of the relocatable screw element which hits a projection that is fixedly disposed in the casing when the toothed drive wheel reaches the highest tooth of the toothing. According to a preferred embodiment, the toothing of the relocatable screw element is limited by an axial projection next to the highest tooth, which blocks the toothed drive wheel at the end of the axial toothing. In order to block the toothed drive wheel, the axial projection has no teeth and is made so massively that the toothed drive wheel cannot be rotated beyond it. When the toothed drive wheel engages into the deepest tooth of the toothing, further rotation of the relocatable screw element is prevented by the step which the toothing has towards the neighbouring highest tooth.

The pipette of the present invention is preferably a hand-held pipette. In this, it is dealt with a pipette which can be held and operated by the user with only one hand in the pipetting. The pipette is preferably a mechanically driven pipette. But in principle it is also possible to realise the pipette with an electric drive or with a mechanical drive having force assistance by an electric drive (servo drive).

BRIEF DESCRIPTION OF THE SEVERAL VIEWS OF THE DRAWINGS

The invention will be explained in more detail below by way of the attached drawings of an example of its realisation. In the drawings show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In the present application, the designations “up” and “down”, “above” and “below” and “horizontal” and “vertical” refer to an orientation of the pipette in which the casing is oriented vertically downward with the seat. In this orientation, a pipette point fastened on the seat can be directed towards a vessel situated there under, in order to aspirate or to deliver a liquid.

Figure 1:
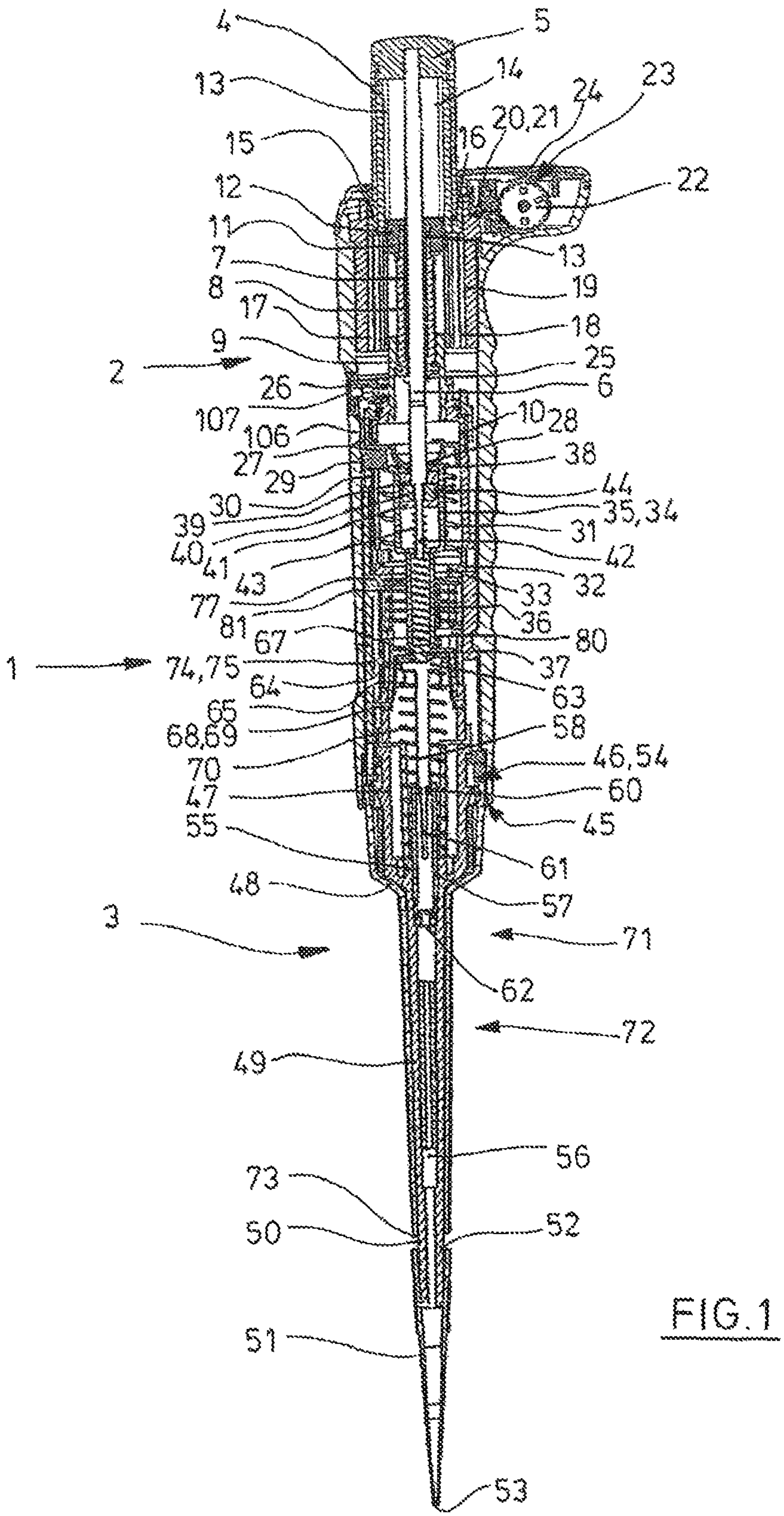
FIG. 1 a pipette of the present invention in a longitudinal section.
Figure 2:
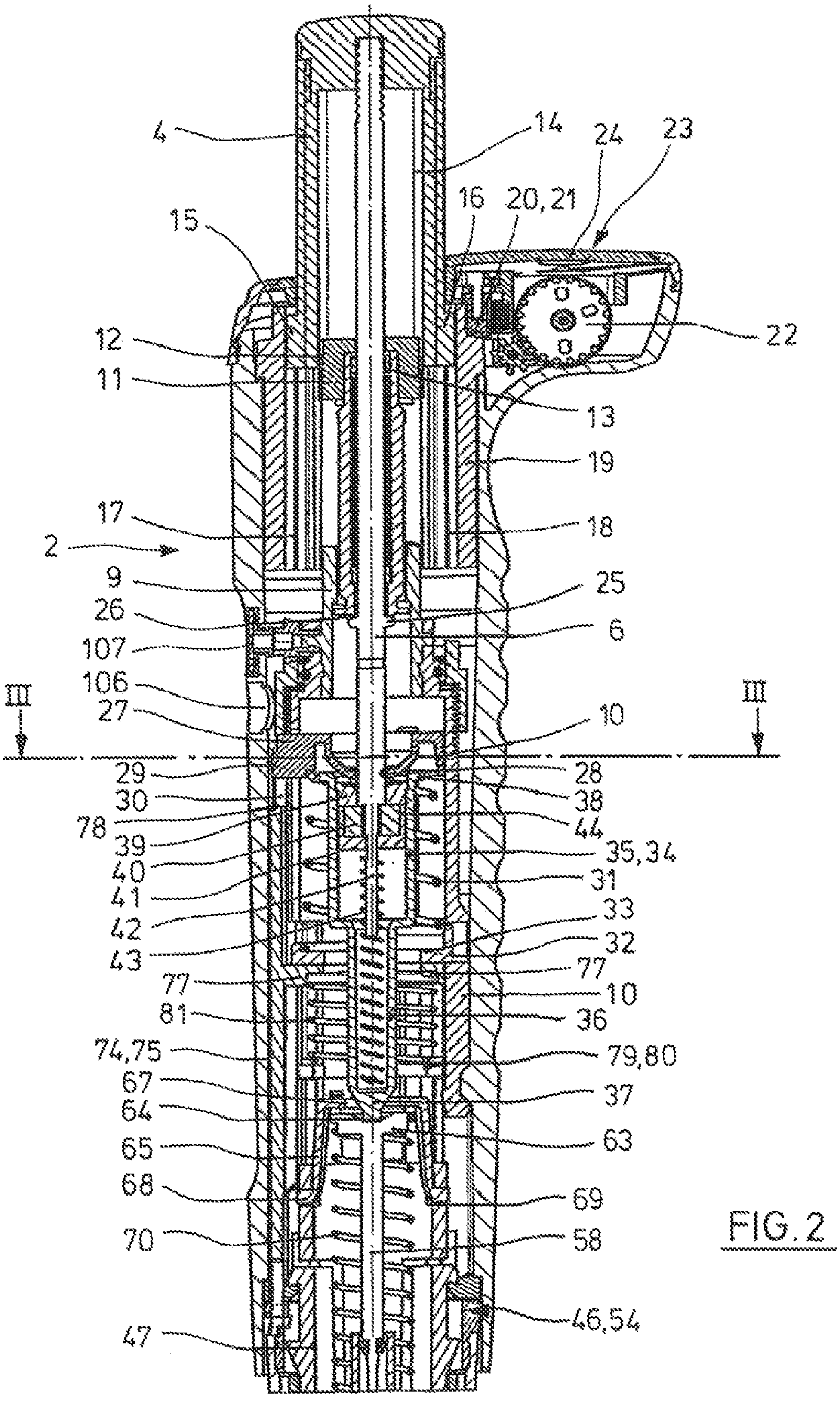
FIG. 2 the same pipette in a magnified longitudinal section through an upper portion.

According to FIGS. 1 and 2, the pipette 1 has a rod-shaped casing, formed as a handle, with an upper part 2 of the casing and a lower part 3 of the casing. The upper part 2 of the casing forms a drive unit with all the components contained therein, and the lower part 3 of the casing a displacer unit with all the components contained therein. An actuating element 4 in the form of a cylindrical push-button projects upwardly from the upper part 2 of the casing at the topside thereof. The actuating element 4 is mounted in the upper part 2 of the casing so as to be axially movable and rotatable.

The actuating element 4 is screwed fast on a cylindrical lifting rod 6 by a thread in a cover 5. In the upper part 2 of the casing, the lifting rod 6 is guided through an upper passage channel 7 of a threaded spindle 8. The threaded spindle 8 is screwed into an internal thread of a spindle nut 9 which is held in a defined position in the upper part 2 of the casing.

The spindle nut 9 is fixedly connected to a lifting body 10, which is fastened in the upper part 2 of the casing. The lifting body 10 is essentially cylindrical and is a carrier for the spindle nut 9, the threaded spindle 8 screwed in therein and the lifting rod 6 guided therein. When the pipette is being assembled, these and other component parts are pre-assembled on the lifting body 10, and the lifting body 10 equipped with the component parts is mounted in the upper part 2 of the casing, so that it is fixedly held in the upper part 2 of the casing. For this purpose, the lifting body 10 is latched with the upper part 2 of the casing. But in principle it is also possible to mount the component parts that are pre-assembled on the lifting body 10 directly in the upper part 2 of the casing. For this purpose, the upper part 2 of the casing can be configured at the inside corresponding to the lifting body 10.

At the topside, the threaded spindle 8 has a spindle driving tenon 11, connected to it so as to be blocked against rotation. On the circumference, the spindle driving tenon 11 has a hexagon 12 with central hole 13. The hexagon 12 engages into a hexagon socket 14 of the actuating element 4.

At the bottom, the actuating element 4 is provided with two diametrically opposite radial projections 15, 16, which project outwardly. There are preferably four radial projections 15, 16. The radial projections 15, 16 engage into axially running grooves 17, 18 at the inner side of a hollow cylindrical transmission part 19, which is rotatably mounted in the upper part 2 of the casing. At the top, the transmission part 19 has a toothed ring 20 on the circumference, which is engaged with a toothed wheel of a counter gear system 21, which drives several counter wheels 22, disposed side by side on a horizontal axis, of a counter mechanism 23. The counter mechanism 23 is fastened on the upper part of the casing. Each of the counter wheels 22 has numerals from 0 to 9. The rearmost counter wheel 22 with respect to FIG. 1 is driven by the counter gear system 21. The counter wheels 22 disposed aside are each turned further for one numeral when the counter wheel disposed behind it changes over from 9 to 0.

Above the counter mechanism 23, the upper part 2 of the casing has a casing cover 24 with a window, through which the numerals of the counter wheels 22 can be read out.

Below the threaded spindle 8, a bead-like collar 25 is disposed on the lifting rod 8 as a stop element. The relocation of the lifting rod 6 towards the upside is limited by abutment of the collar 25 on the lower front side 26 of the threaded spindle 8, which forms an upper stop body for the collar 25.

An essentially disc-shaped lower stop body 27 is disposed in the lifting body 10 below the spindle nut 9. The lower stop body 27 has a cup-shaped deepening, in which a lower passage channel 28 is centrally disposed. Further, the lower stop body 27 has several (for instance three or four) projections 29, radially projecting outwardly, which are uniformly distributed about its circumference.

Figure 3:
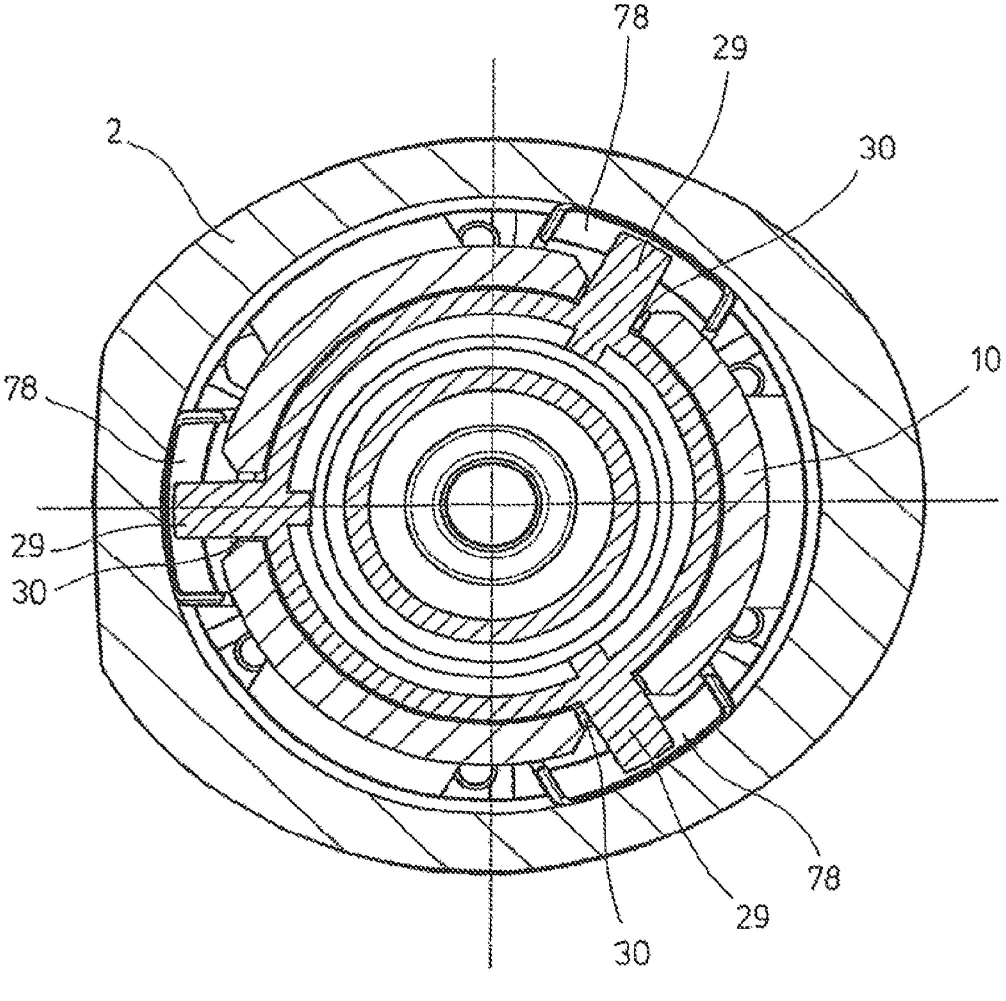
FIG. 3 an enlarged section along the line III-III of FIG. 2.

The lower stop body 27 is guided on the projections 29 in axially running guide slots 30 of the lifting body 10. This is also shown in FIG. 3. It can be relocated upwardly up to the abutment position of the projections 29 at the upper end of the guide slots 30.

An overstroke spring 31 realised as a helical spring is arranged in the lifting body 10 below the lower stop body 27. At the topside, the overstroke spring sits close on the bottom side of the lower stop body 27. At the downside, the overstroke spring 31 is supported on an overstroke spring support 32 which is disposed in the upper part 2 of the casing and fixedly connected to it.

The overstroke spring support 32 is formed by a ring with L-cross section, wherein the horizontal leg of the L-profile borders a central guide-through hole 33 of the overstroke spring support 32. The overstroke spring 31 is supported by the horizontal leg of the L-profile and is laterally enclosed by the vertical leg. The overstroke spring 31 pushes the lower stop body 27 against the upper ends of the guide slots 30 under bias with the projections 29.

Below the lower stop body 27, a drive element 34 in the form of a sleeve, aligned coaxially to the lifting rod 6, exists in the lifting body 10. The drive element 34 has an upper sleeve portion 35 and a lower sleeve portion 36, wherein the upper sleeve portion 35 has greater inner and outer diameters than the lower sleeve portion 36. The lower sleeve portion 36 has a tip 37 in the form of a truncated cone at the downside.

On the upper edge of the upper sleeve portion 35, there is a further circulating collar 38 which projects radially towards the outside. The outer diameter of the upper sleeve portion 35 is smaller than the inner diameter of the guide-through hole 33 of the overstroke spring support, 32, so that the lower and the upper sleeve portion 35, 36 can be introduced into the guide-through hole 33. The outer diameter of the further collar 38 exceeds the inner diameter of the guide-through hole 33, so that the drive element 34 cannot pass completely through the guide-through hole 33. The overstroke spring support 32 forms an end stop, and the further collar 38 an end stop element, which limit the relocation of the drive element 34 towards the downside.

A hollow cylindrical anchor 39 made of a ferromagnetic material is disposed at the top of the upper sleeve portion 35. A hollow cylindrical magnet 40 is disposed there under in the upper sleeve portion 35. Below of it there is a pot 41, which accommodates the magnet 40. The anchor 39 has a press fit in the upper sleeve portion 35. The lifting rod 6 extends movably through the central hole of the anchor 39. Underneath of the anchor, the lifting rod 6 has a needle-shaped portion 42 with reduced diameter. The magnet 40 and the pot 41 sit on the needle shaped portion 42. Magnet 40 and pot 41 are preferably fixed on the needle-shaped portion 42, for instance by having a press fit there. Moreover, the magnet 40 is supported at its topside on a shoulder of the lifting rod, from which the needle shaped portion 42 emerges.

Below the ring disc 41, an uncoupling spring 43 realised as a helical spring is guided on the needle-shaped portion 42 and is supported on the bottom 43 of the lower sleeve portion 36. Anchor 39, magnet 40 and uncoupling spring 43 are component parts of an uncoupling device 44.

According to FIGS. 1, 2, 5 and 6, at the inner circumference next to a lower casing opening 45, the upper part 2 of the casing is provided with means 46 for detachable connection to further means for detachable connection to the lower part 3 of the casing, the means 46 not being explained in more detail.

The lower part 3 of the casing has a hollow cylindrical portion 47 at its topside, which is followed by a short upper hollow cone portion 48 with great cone angle at the downside, which is in turn followed by a long lower hollow cone portion 49 with small cone angle, which forms a conical neck 50 for clamping up a pipette point 51 with its lower end. A clamped-up pipette point 51 is also essentially conical with an upper opening 52 for plugging up onto the neck 50 and with a lower opening 53 for the passage of liquid. The upper opening 52 is significantly greater than the lower opening 53, and the pipette point 51 tapers from the upper to the lower opening.

At the upper side on the outer circumference, the hollow cylindrical portion 47 of the lower part 3 of the casing is provided with further means for detachable connection 54 not explained in more detail, which are matched to the means 46 for detachable connection of the upper part 2 of the casing, in order to detachably connect the lower part 3 of the casing with the upper part 2 of the casing. Suitable means for detachable connection 64, 54 of the lower part 3 of the casing and the upper part 2 of the casing are described in the document DE 10 2004 003 434 B4. In this respect, it is made reference to DE 10 2004 003 434 B4 and US2005/155438 A1, whose entire content is incorporated into the present application by reference.

At the top, the lower hollow cone portion 49 has a prolongation 55 in the lower part of the casing 3 which projects beyond the upper hollow cone portion 48.

The lower hollow cone portion 49 has a connection channel 56, which connects the upper front surface of the prolongation 55 with the lower front surface of the neck 50.

An arrangement of a cylinder 57 with a piston 58 relocatable therein is disposed in the lower part 3 of the casing. The cylinder 57 is set into the connection channel 56 with a lower area thereof, and fixed therein by pressing or gluing. At the bottom, the cylinder 57 is sealed with respect to the connection channel 56 by means of an O-ring 59.

The piston 58 has a piston seal 60 on its circumference, which seals on the cylinder 57 at the inside. Below the piston seal 60, the piston 58 has a needle-shaped extension 61 which can be introduced into a passage opening 62 in the bottom of the cylinder 57 and into the connection channel 56 in order to reduce the stagnant volume. Cylinder 57 and piston 58 are aligned vertically. At the top, the piston 58 has a horizontally directed piston disc 63, which has a vertically directed conical indentation 64 for receiving the tip 37 of the drive element 34 at its centre.

At its topside, the lower part 3 of the casing has a pot-shaped closing cap 65 with a cylindrical or conical shell. The bottom of the closing cap 65 is disposed above the piston disc 63 and has a central upper casing opening 67, through which the piston disc 63 is accessible from the topside. On the edge of its shell, the closing cap 65 has outwardly projecting projections 68 which are snapped into corresponding indentations 69 of the hollow cylindrical portion 47 of the lower part 3 of the casing.

The bottom of the closing cap 65 limits the relocation of the piston 58 towards the upside. A piston spring 70, configured as a helical spring and being supported on the prolongation 55 at the bottom and on the bottom side of the piston disc 63 at the top, pre-loads the piston 58 against the bottom side of the closing cap 65.

The pipette 1 has further an ejection device 71. The ejection device 71 comprises an ejection slide 72, which is disposed on the lower part 3 of the casing. The ejection slide 72 has a contour that is adapted to the contours of the hollow cylindrical portion 47, the upper hollow cone portion 48 and the lower hollow cone portion 49. At the bottom, it has an annular ejection end 73. In the position of the ejection slide 72 of FIG. 1, the ejection end 73 is pushed up towards the upside onto the lower part 3 of the casing as far as possible, so that the conical neck 50 is free for plugging up a pipette point 51.

At the topside, the ejection slide 72 is connected to an ejection lengthening 74. The latter comprises three vertical ejection rods 75, which are connected to the upper edge of the ejection slide 72. The ejection rods 75 are uniformly distributed over the upper edge of the ejection slide 72. At the bottom, the ejections rods 75 are connected via a first snap connection to an ejection ring 76, which is connected to the upper edge of the ejection slide 72 via a second snap connection. In a distance from the ejection ring 76, the ejection rods 75 are connected to each other by an annular upper ejection spring support 77 on their inner circumference at the top. The upper ejection spring support 77 has an L-shaped cross section, wherein the horizontal leg of the cross section is adjacent to the guide-through hole 33 below the overstroke spring support. The vertical, circulating leg of the upper ejection spring support 77 is directed downward.

The ejection rods 75 have actuating ends 78 at the top.

The ejection lengthening 74 or the ejection rods 75, respectively, extend into the upper part 2 of the casing through the lower casing opening 45. The relocation of the ejection lengthening 74 towards the upside is limited by the close sitting of the upper ejection spring support 77 on the bottom of the overstroke spring support 32.

Figure 4:
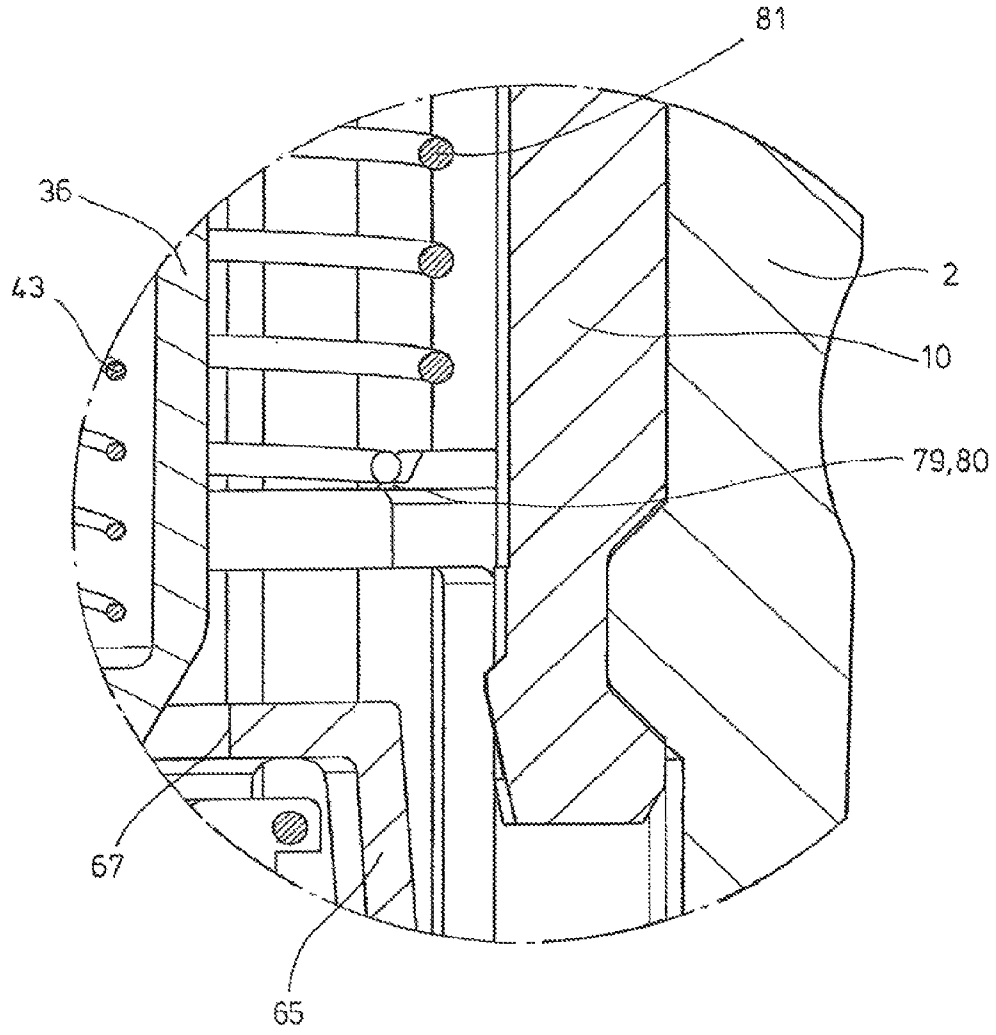
FIG. 4 a magnified detail IV of FIG. 2.
Figure 5:
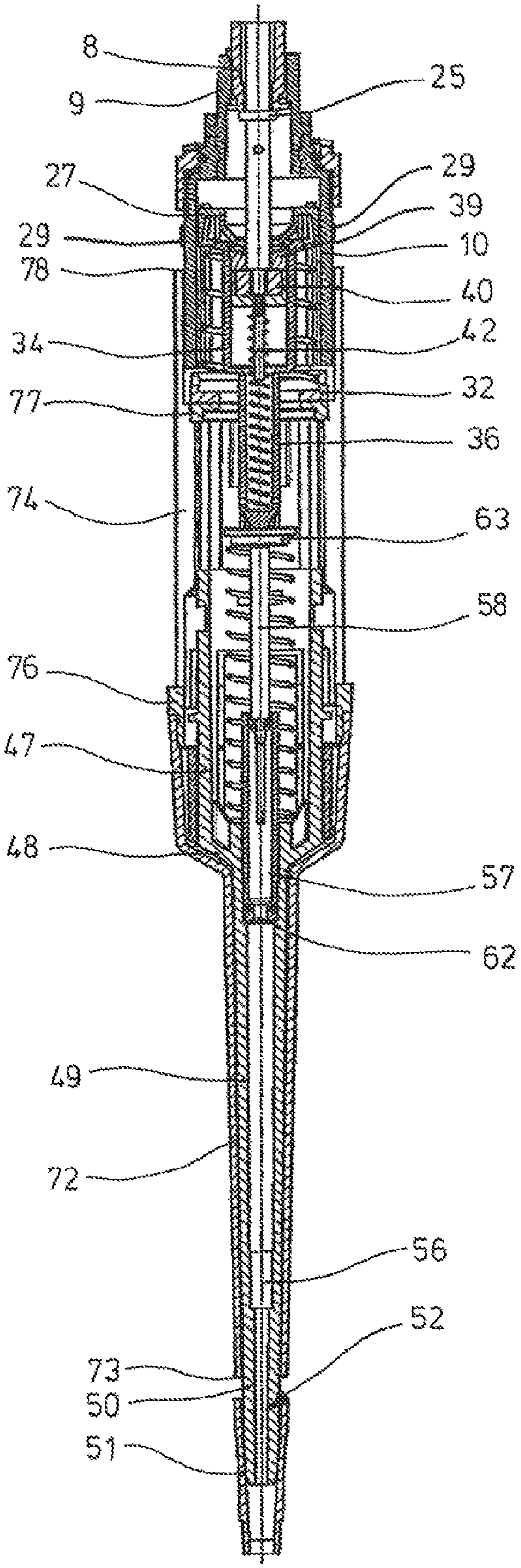
FIG. 5 the same pipette in a magnified longitudinal section through a lower portion.
Figure 6:
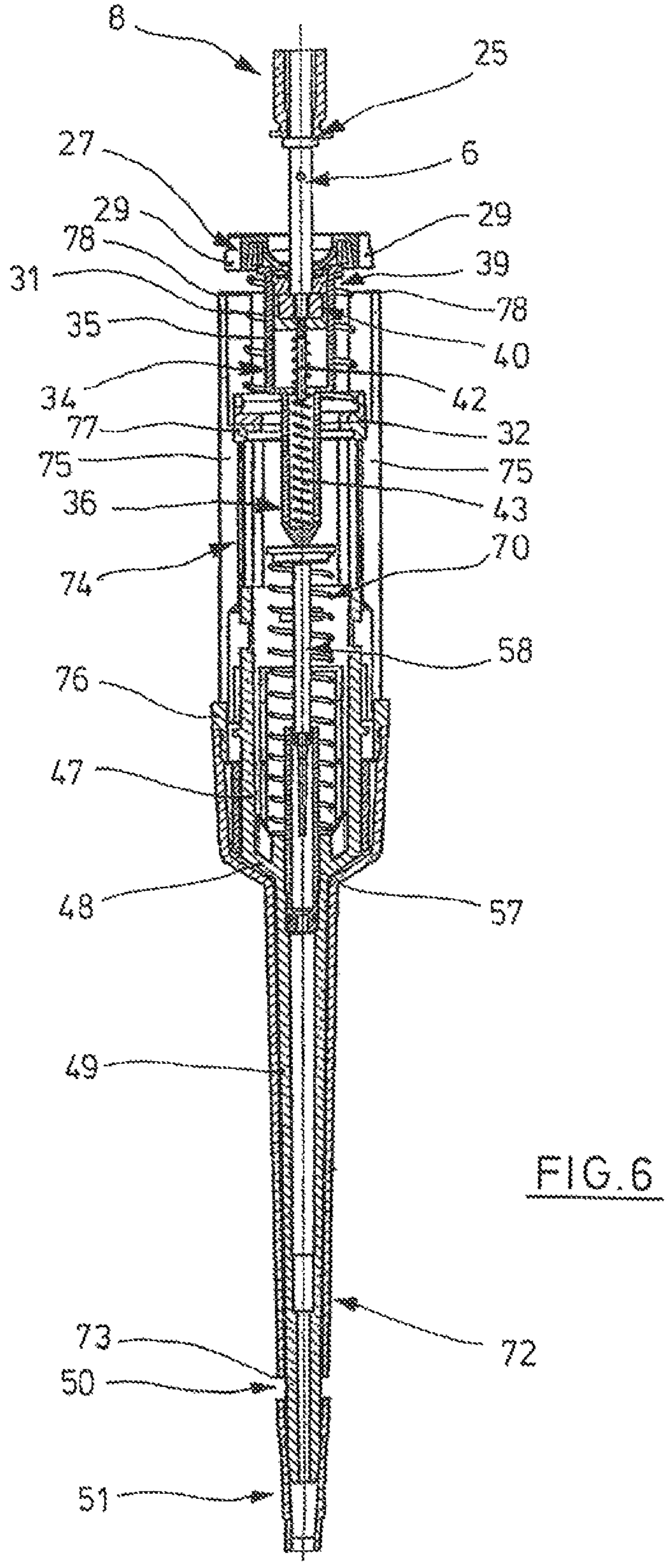
FIG. 6 the same pipette without lifting body in a magnified longitudinal section through a lower portion.

Below the upper ejection spring support 77, three bridges 79 project from the inner side of the upper part 2 of the casing, which are uniformly distributed over the inner circumference and grasp through recesses of the lifting bodies 10. This is shown in FIG. 4 in particular. The bridges 79 form a lower ejection spring support 80. An ejection spring 81, formed as a helical spring, is disposed under bias between the upper ejection spring support 77 and the lower ejection spring support 80 and presses the ejection device 71 upward, so that the upper ejection spring support 77 sits close on the overstroke spring support 32.

The lower part 3 of the casing is guided into the lower casing opening 45 of the upper part 2 of the casing with an upper region of the hollow cylindrical portion 47. The means 46, 54 for detachable connection of the lower part 3 of the casing and the upper part 2 of the casing are detachably connected to each other. The drive element 34 engages with the tip 37 into the upper casing opening 67 and sits close to the piston disc 63 in the indentation 63. The piston disc 63 pushes the drive element 34 upward, and via the uncoupling device 44, the lifting rod 6 is pressed against the threaded spindle 8 with the collar.

Figure 7:
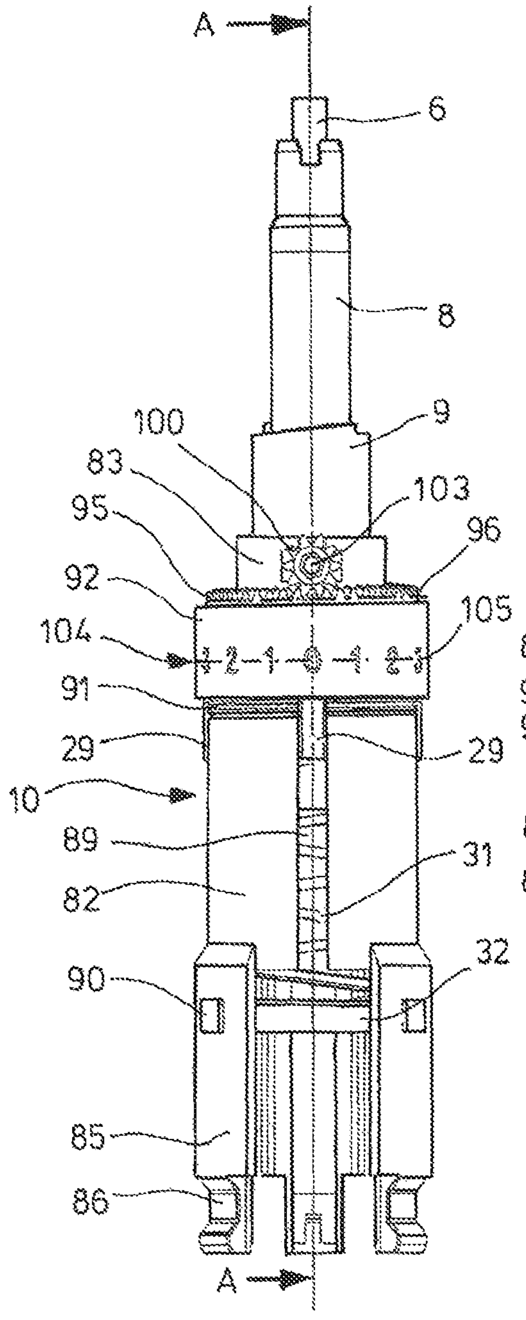
FIG. 7 subassembly comprising lifting body, threaded spindle, lower stop body, overstroke spring and components for user calibration in a side view.
Figure 8:
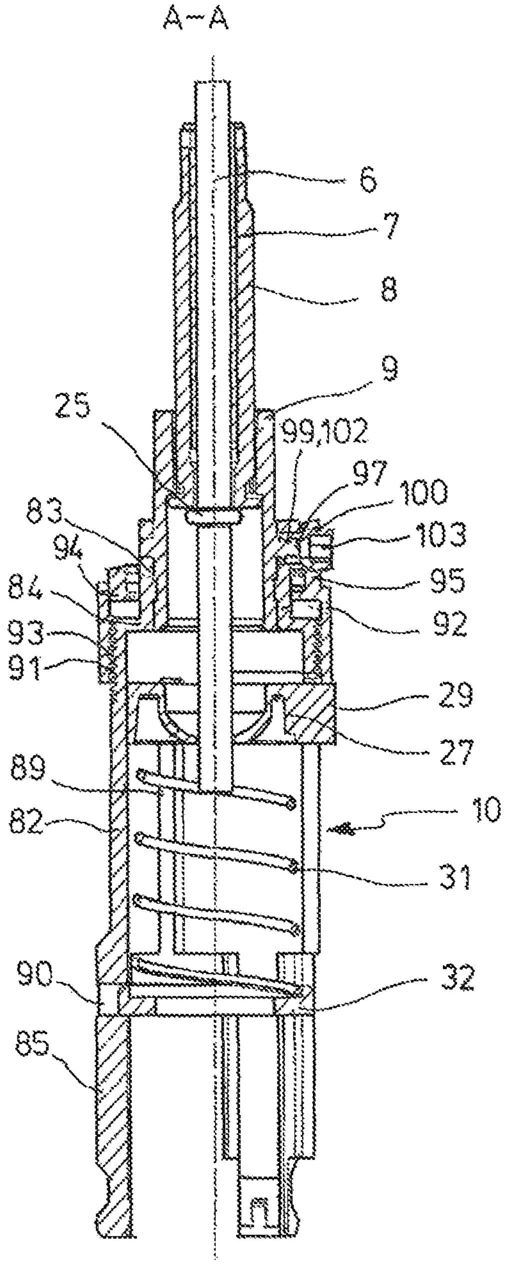
FIG. 8 the same subassembly in a vertical section.

According to FIGS. 7 and 8, the lifting body 10 has a lower hollow cylindrical portion 82 and an upper hollow cylindrical portion 83, wherein the upper hollow cylindrical portion 83 has a smaller inner and outer diameter and is shorter than the lower hollow cylindrical portion 82. The upper edge of the lower hollow cylindrical portion 82 is connected to the lower edge of the upper hollow cylindrical portion 83 by an annular disc shaped shoulder 84.

Three spring struts 85 of the lifting body 10 project downward from the lower edge of the lower hollow cylindrical portion 82, parallel to the centre axis of the lower and upper hollow cylindrical portions 82, 83. In the region of the spring struts 85, the lifting body 10 has generally a greater wall thickness than in the region of the lower and upper hollow cylindrical portions 82, 83. Near to their lower ends, the spring struts 85 are provided with indentations 86 at the outside for catch-locking with corresponding elevations of the upper part 2 of the casing.

The spindle nut 9 is essentially hollow cylindrical and inserted into the upper hollow cylindrical portion 83 with a lower portion. The spindle nut 9 and the upper hollow cylindrical portion 83 are made by means of two-component injection moulding, and are also directly connected to each other through this.

As already mentioned, the threaded spindle 8 is screwed into the spindle nut 9, and the lifting rod 6 is inserted into the upper passage channel 7 of the spindle nut 8.

The lifting body 10 has several axially extending slots 89 in the lower hollow cylindrical portion 82. The slots 89 begin at a distance from the upper edge of the lower hollow cylindrical portion 82, and extend up to the lower edge of the lower hollow cylindrical portion 82. In the example, there are four slots 89, which are uniformly distributed over the circumference of the lower hollow cylindrical portion 82.

The lower stop body 27 is inserted into the lower hollow cylindrical portion 82. Four radial projections 29 of the lower stop body 27 grip through the slots 89 and project somewhat outward from the outer circumference of the lower hollow cylindrical portion 82.

The overstroke spring support 32 has the shape of a disc with an upward projecting edge. With its outer edge, the overstroke spring support 32 is caught in recesses 90 at the inner side of the spring struts 85. For reasons of easy manufacture, the recesses 90 extend from the inner side up to the outer side of the spring struts 85.

The overstroke spring 31 is arranged in the lower hollow cylindrical portion 82 between the lower stop body 27 and the overstroke spring support 32. It is under bias, so that it pushes the lower stop body 27 upward.

On its outer circumference, the lower hollow cylindrical portion 82 has an external thread 91 which begins at the upper edge. The slots 89 extend into a lower portion of the external thread 91.

An annular cylindrical threaded ring 92 having an internal thread 93 is screwed on the external thread 91. At its upper edge, the threaded ring 92 has an inward projecting, further annular disc shaped shoulder 94, which is disposed above the shoulder 84. On the upper edge or on the further shoulder 94, respectively, there is a toothing 95 with teeth directed parallel to the instantaneous axis of the internal thread 93. The toothing 95 runs along a helical line 96 around the instantaneous axis of the internal thread 93, which has the same pitch as the external thread 91 and the internal thread 92. The toothing 95 is a bevel wheel toothing.

The stop body 27 is pressed against the lower edge of the threaded ring 92 with its projections 29 by the overstroke spring 31.

At the outer circumference, the spindle nut 9 has a bearing 97 in the form of a radially outwardly projecting spigot, which projects into a breakthrough 98 of the upper hollow cylindrical portion 83. At its outer circumference, the spigot has a circulating catch groove 99. A toothed drive wheel 100 is put onto the bearing 97 with a hollow shaft 101 which has a circulating catch bead 102 at the inner circumference, so that the catch bead 102 engages into the catch groove 99. The toothed drive wheel 100 can be rotated on the bearing 97. The toothed drive wheel 100 is engaged with the toothing 95 of the threaded ring 92 as a pinion. The toothed drive wheel 100 is configured as a bevel wheel.

On an outer front side, the toothed drive wheel 100 has a tool application device 103 in the form of a hexagon socket.

On the outer circumference of the threaded ring 92, marks 104 are arranged in the form of arabic numerals. Starting from a centrally arranged numeral 0, numerals 1 2 3 . . . are arranged in ascending order in the different circumferential directions. The marks 104 are uniformly distributed over the perimeter.

Figure 9:
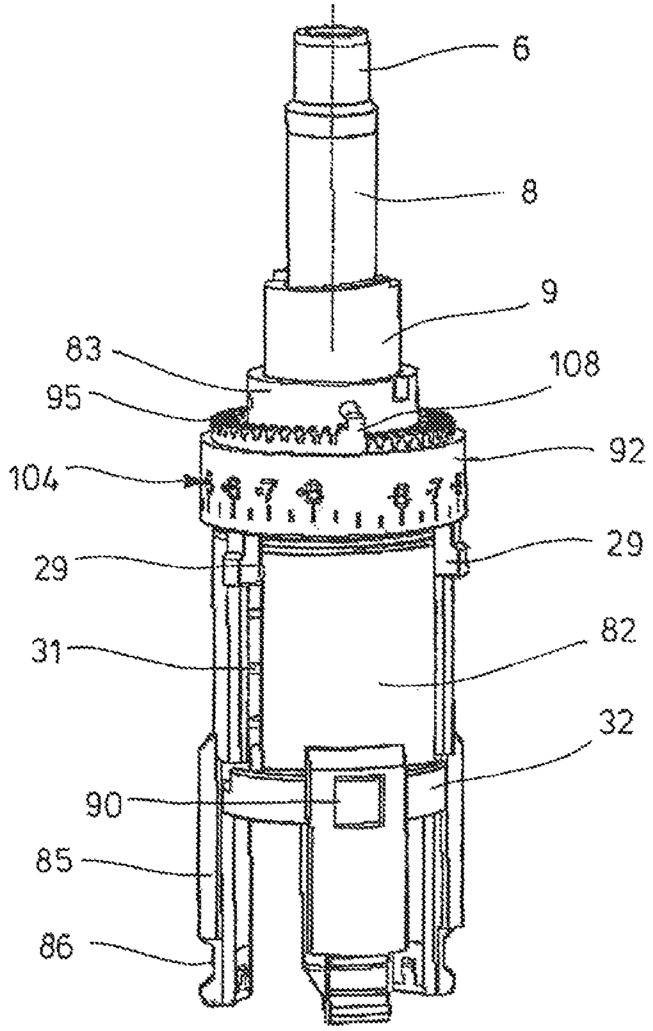
FIG. 9 the same subassembly in a perspective view from the side opposite to that of FIG. 7.

The marks 104 are arranged on a further helical line 105, which has the same pitch as the external thread 91 and the internal thread 93 (compare FIG. 9).

According to FIGS. 1 and 2, the threaded ring 92 is arranged in the lower part of the casing 2 below a window 106, so that always one mark 104 is visible from the outside. Moreover, the toothed drive wheel 100 is arranged below a hole 107 in the upper part 2 of the casing, so that a tool in the form of a hexagon key can be put into the tool application device 103 from the outside.

The pipette 1 can be used as follows:

It is grasped on the upper part 2 of the casing. A metering stroke is set by rotating the actuating element 4 until the counter wheels 22 indicate the desired metering volume. When the actuating element 4 is being rotated, the threaded spindle 8 is rotated via the spindle driving tenon 11, and is axially relocated due to its thread connection to the spindle nut 9 which is stationary in the upper part 2 of the casing. In this, the spindle driving tenon 11 slips into the hexagon socket of the actuating element 4. At the same time, the transmission part 19 is rotated via the further radial projections 15, 16, and the counter mechanism is adjusted. As a consequence, the set axial position of the threaded spindle 8 in the upper part 2 of the casing, and thus also the metering volume can be read on the counter mechanism 23.

Further, a pipette point 51 is clamped onto the neck 50, preferably by pushing the latter into a pipette point 51 which is held ready in a holder.

Before sucking up liquid, air is ejected out of the cylinder 57 by pushing the piston 58 downward by means of the actuating element 4, until the further collar 38 hits the lower stop body 27. In this, the lifting rod 6 moves the drive element 34 downward via the uncoupling device 44, and the piston 58 is pressed deeper into the cylinder 57. Due to the force between magnet 40 and anchor 39, the uncoupling device 44 does not uncouple in this.

Thereafter, the lower end of the pipette tip 51 is dipped into the liquid by means of the pipette 1, and the desired amount is sucked into the pipette tip 51 by releasing the actuating element 4. In this, the piston spring 70 pushes the piston 58, and with it the drive element 34 as well as the lifting rod 6, back into the initial position in which the collar 25 sits close on the threaded spindle 8.

The pipette 1 is shown in FIGS. 1, 2, 5, 6 and 10*a* in this situation.

Figure 10:
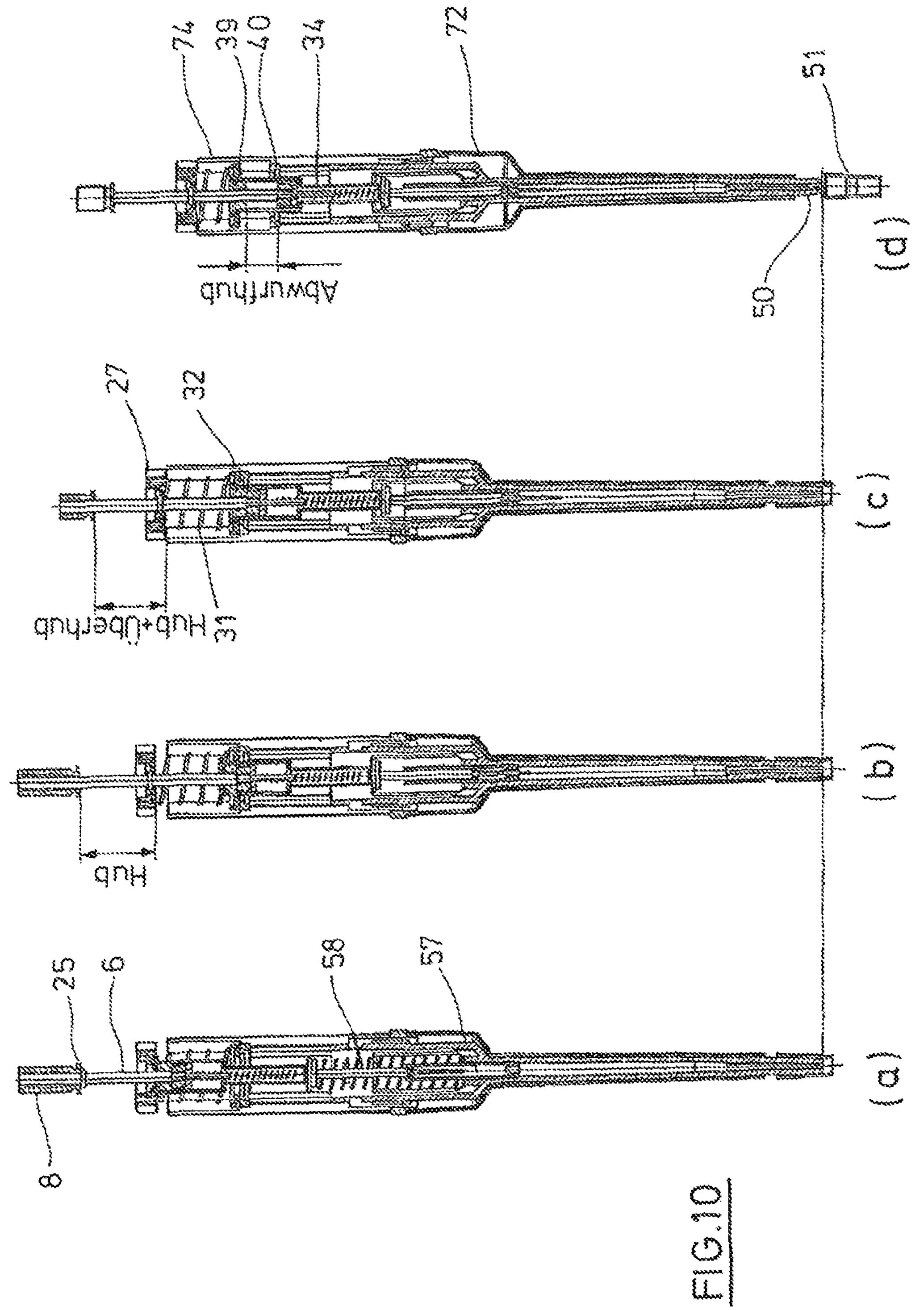
FIG. 10*a* to *d* the same pipette before the actuation of the actuating element (FIG. 10*a*), after the complete execution of the metering stroke and before the execution of the overstroke (FIG. 10*b*), after the execution of the overstroke before the ejection of the pipette tip (FIG. 10*c*) and after the ejection of a pipette tip (FIG. 10*d*), always in a partial longitudinal section.

Thereafter, the pipette tip 51 can be directed to another vessel with its lower end by means of the pipette 1. By pushing downward the actuating element 4, the lifting rod 6 is moved downward and the drive element 34 is relocated downward via the uncoupling device 44, so that the piston 58 is moved downward in the cylinder 57 anew. In this, the set metering amount is essentially delivered. This situation is shown in FIG. 10*b*.

Residuals that have remained in the pipette tip 51 can be blown out by pushing the actuating element 4 further downward under increased force. In this, the lower stop body 27 is relocated downward in the guide slots 30 against the action of the overstroke spring 31, and via the uncoupling device 44, the drive element 34 is relocated further downward and pushes the piston 58 still deeper into the cylinder 57. In the overstroke, a further positive pressure is generated, which pushes out residual liquid which is adhered on the inner wall pipette tip 51.

The overstroke is ended when the drive element 34 hits with the further collar 38 the overstroke spring support 32 which forms the end stop. At the same time, the projections 29 reach the actuating end 78 of the ejection lengthening 74 or are situated above it in a very small distance. This situation is shown in FIG. 10*c*.

Thereafter, the pipette tip 51 can be ejected. For this purpose, the actuating element 4 is pushed further downward with increased force. The overstroke spring 32 prevents the drive element 34 from continuing the downward motion. By the increased force, the magnet 40 is detached from the anchor 39 and the lifting rod 6 moves further downward and takes the lower stop body 27 along. With the projections 29, the lower stop body 27 pushes the ejection lengthening 74 downward on the actuating ends 78. The ejection lengthening 74 takes the ejection slide 72 along towards the downside, which pushes the pipette tip 51 off from the neck 50 with its ejection end 73.

During the ejection stroke, the piston 58 is not moved downward any further in the cylinder 57. As a result, no clearance volume is needed in the cylinder 57 at the downside, and the piston 58 does not hit the bottom of the cylinder 57. When the magnet 40 is released from the anchor 39, the force for relocating the actuating element 4 further downward is reduced again. The ejection is ended when the ejection lengthening 74 hits a not depicted ejection stop in the casing. This situation is shown in FIG. 10*d*.

After releasing the actuating element 4, the pipette 1 reverts automatically into the starting position of FIGS. 1, 2, 5, 6 and 10*a*. In this, the ejection spring 108 pushes the ejection lengthening 74 upward, and with it the ejection slide 72. Further, the uncoupling spring 43 pushes upward the lifting rod 6 with the magnet 40, until the magnet 40 is held fast on the anchor 39 by the magnetic forces. Further, the overstroke spring 31 pushes the lower stop body 27 upward until the projections 29 have reached the upper ends of the guide slots 30. Further, the piston spring pushes upward the piston 58, the drive element 34 and via the uncoupling device 44 the lifting rod 6, until the collar 25 sits close to the threaded spindle 8.

In a further variant, the uncoupling device 44, 43 can be omitted in order to perform the stroke, overstroke and ejection stroke. The lifting rod 6 acts directly on the conical indentation of the piston 58.

The upper part 2 of the casing can be connected just simply with another, lower part 3 of the casing so as to form a casing, wherein the cylinder 57 and the piston 58 have another cross section. Correspondingly, the same upper part 2 of the casing can be used for making pipettes 1 having different metering volumes. Further, it is possible to replace the lower part 3 of the casing or the upper part 2 of the casing easily in case of a trouble, or to equip the upper part 2 of the casing with another lower part 3 of the casing if needed. In addition, the lower part 3 of the casing can be removed easily from the upper part 2 of the casing for purposes of maintenance, repair and cleaning.

The pipette 1 has a factory calibration, i.e. it is calibrated by the manufacturer of the pipette 1. The settings of the counter mechanism 23 and the threaded spindle 8 are matched for this purpose. In this matching, the threaded ring 92 is adjusted such that the numeral 0 can be seen through the window 106.

The user can perform a user calibration by rotating the toothed driving wheel 100 in the one or the other direction by means of a polygon key. In this, the threaded ring 92 on the external thread 91 is relocated axially. The lower stop body 27, which is pushed against the lower edge of the threaded ring 92 by the overstroke spring 31, is also axially relocated correspondingly. Through this, the stroke is also changed which the lifting rod 6 performs when the collar 25 is relocated from the threaded spindle 8 up to the lower stop body 27. An axially directed projection 108 next to the uppermost tooth of the axially directed toothing 95 prevents the toothed driving wheel 100 from disengaging from the toothing 95 (FIG. 9).

In order to adjust the threaded ring 9, the user may be provided with tables which indicate the marks 104 to be adjusted into the window 106 depending on the surroundings conditions (pressure, temperature) and the properties of the liquid to be pipetted (density, surface tension). Alternatively, the user can determine suitable settings by measurements himself, and set them in the user calibration.

The factory calibration can be easily found again by rotating the threaded ring 92 such that that the zero numeral is visible in the window 106.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

LIST OF THE USED REFERENCE SIGNS

1 pipette
2 upper part of the casing
3 lower part of the casing
4 actuating element
5 cover of the actuating element
6 cylindrical lifting rod
7 upper passage channel
8 threaded spindle
9 spindle nut
10 lifting body
11 spindle driving tenon
12 hexagon
13 hole
14 hexagon socket
15, 16 radial projections
17, 18 grooves
19 transmission part
20 toothed ring
21 counter gear system
22 counter wheels
23 counter mechanism
24 casing cover
25 bead-like collar
26 lower front side
27 lower stop body
28 lower passage channel
29 projections
30 guide slots
31 overstroke spring
32 overstroke spring support
33 guide-through hole
34 drive element
35 upper sleeve portion
36 lower sleeve portion
37 tip in the shape of a truncated cone
38 further collar
39 hollow cylindrical anchor
40 hollow cylindrical magnet
41 pot
42 needle-shaped portion
43 uncoupling spring
44 uncoupling device
45 lower casing opening
46 means for detachable connection
47 hollow cylindrical portion
48 upper hollow cone portion
49 lower hollow cone portion
50 conical neck
51 pipette tip
52 upper opening
53 lower opening
54 further means for detachable connection
55 extension

56 connection channel
57 cylinder
58 piston
59 O-ring
60 piston seal
61 needle-shaped extension
62 passage opening
63 piston disc
64 conical indentation
65 cylindrical closing cap
67 upper casing opening
68 projections
69 indentation
70 piston spring
71 ejection device
72 ejection slide
73 ejection end
74 ejection lengthening
75 ejection rod
76 ejection ring
77 upper ejection spring support
78 actuating end
79 bridge
80 lower ejection spring support
81 ejection spring
82 lower hollow cylindrical portion
83 upper hollow cylindrical portion
84 annular disc shaped shoulder
85 spring strut
86 indentation
87 latch element
88 latch element
89 slot
90 recess
91 external thread
92 screw ring
93 internal thread
94 further annular disc shaped shoulder
95 axially directed toothing
96 helical line
97 bearing
98 breaking-through
99 catch groove
100 toothed driving wheel
101 shaft
102 catch bead
103 tool application device
104 marks
105 further helical line
106 window
107 hole
108 axial projection The inventin claimed is:

1. A pipette with a rod-shaped casing (2, 3), a seat (50) for detachably holding a pipette tip (51) on the lower end of the casing (2, 3), a displacement equipment, comprising a displacement chamber (57) with a relocatable limit (58), a connection channel (56), connecting the displacement chamber (57) with an opening in the seat, a drive equipment for relocating the relocatable limit (58) of the displacement chamber (57), coupled to the relocatable limit (58) and having an axially relocatable lifting rod (6), an upper stop body (8), a lower stop body (27) and a stop element (25) on the circumference of the lifting rod (6) for limiting the stroke of the lifting rod (6), an overstroke spring (31), via which the lower stop body (8) is supported against relocation towards the downside on an overstroke spring support (32), a stationary screw element (10), fixedly connected to the casing (2, 3), and with a screw element (92) that is relocatable in the casing and is engaged to the stationary screw element (10) and is coupled to the lower stop body (27) in order to relocate it in the axial direction of the lifting rod (6) when the relocatable screw element (92) is being relocated, a toothing (95), running along a helical line (96) with the same pitch as that of the thread (93) of the relocatable screw element (92) and having teeth on the upper edge of the relocatable screw element (92) that are directed in the direction of the instantaneous axis of the relocatable screw element (92), a toothed driving wheel (100), rotatably mounted on a bearing (97) that is fixedly connected to the casing (2, 3), and being engaged with the toothing (95) of the relocatable screw element (92), and means (103) for rotating the toothed driving wheel (100).

2. The pipette according to claim 1, wherein the relocatable screw element (92) is a threaded ring, disposed concentrically to the lifting rod and having a thread (93) on the circumference, which has the toothing (95) at the topside and rests on the lower stop body (27) at the downside.

3. The pipette according to claim 2, wherein the stationary screw element (10) is a hollow cylindrical lifting body which has an external thread (91) at the outer circumference to which an internal thread (93) on the inner circumference of the threaded ring (92) is engaged, the lifting body (10) has several axially extending slots (89), the lower stop body (27) is arranged in the lifting body (10) and the lower stop body (27) has several outwardly projecting projections (29) which grip through the slots (89) and have portions that jut out of the lifting body (10) and on which the threaded ring (92) is seated.

4. The pipette according to claim 3, wherein the overstroke spring support (32) is disposed in the lifting body (10), and the overstroke spring (31) is disposed in the lifting body (10) between the lower stop body (27) and the overstroke spring support (32).

5. A pipette according to claim 1, wherein the upper stop body (8) is a threaded spindle which is screwed into a spindle nut (9) that is fixedly connected to the casing (2, 3), and which has an upper passage channel (7) through which the lifting rod (6) is guided, and/or the lower stop body (27) is circular disc shaped and has a lower passage channel (28) through which the lifting rod (6) extends.

6. The pipette according to claim 5, wherein the lifting body (10) is fixedly connected to the spindle nut (9) at the topside.

7. A pipette according to claim 3, wherein the bearing (97) of the toothed driving wheel (100) is fixedly connected to the lifting body (10) above the external thread (91).

8. A pipette according to claim 1, wherein the lifting body (10) is connected to the casing via a snap connection.

9. A pipette according to claim 1, wherein the stationary screw element (10) and the relocatable screw element (92) are bevel wheels or contrate wheels.

10. A pipette according to claim 1, which has an indicating equipment (92, 104, 106) for indicating the position of the lower stop body (27).

11. The pipette according to claim 10, wherein the threaded ring (92) has marks (104) at the outer circumference, spaced apart from each other in the circumferential direction, and the casing has a window (106) for reading a mark (104) that is disposed under the window (106).

12. The pipette according to claim 11, wherein the marks (104) on the circumference of the toothed drive wheel (100) are disposed on a further helical line (105), whose pitch corresponds to the pitch of the thread (93) of the relocatable screw element (92).

13. A pipette according to claim 1, wherein the toothed drive wheel (100) has a tool application device (103) for rotating the toothed drive wheel and the casing has a hole (107) through which the tool application device (103) is accessible my means of a tool that is introduced into the hole (107) from the outside.

14. A pipette according to claim 1, which has means for limiting (108) the rotation of the relocatable screw element (92), so that the highest tooth of the toothing (95) cannot disengage from the toothed drive wheel (100).

15. A pipette according to claim 1, wherein the toothing (95) of the relocatable screw element (92) is limited by an axial projection (108) next to the highest tooth, which blocks the toothed drive wheel (100) at the end of the axial toothing (95).

* * * * *